US012675076B2

(12) United States Patent
Born et al.

(10) Patent No.: US 12,675,076 B2
(45) Date of Patent: Jul. 7, 2026

(54) ELECTROMAGNETIC NON-ACOUSTIC ALARM WITH ELECTROMAGNETIC MOTOR HAVING MOVABLE AND STATIONARY CIRCUITS WITH RESILIENT CONNECTION ELEMENTS

(71) Applicant: The Swatch Group Research and Development Ltd, Marin (CH)

(72) Inventors: Jean-Jacques Born, Morges (CH); Gian Carlo Poli, Les Geneveys-sur-Coffrane (CH)

(73) Assignee: The Swatch Group Research and Development Ltd, Marin (CH)

( * ) Notice: Subject to any disclaimer, the term of this patent is extended or adjusted under 35 U.S.C. 154(b) by 372 days.

(21) Appl. No.: 18/446,605

(22) Filed: Aug. 9, 2023

(65) Prior Publication Data

US 2024/0053708 A1     Feb. 15, 2024

(30) Foreign Application Priority Data

Aug. 15, 2022     (EP) .................................... 22190383

(51) Int. Cl.
| | |
|---|---|
| G04B 25/04 | (2006.01) |
| H02K 33/18 | (2006.01) |

(52) U.S. Cl.
CPC ............. G04B 25/04 (2013.01); H02K 33/18 (2013.01)

(58) Field of Classification Search
CPC ........ H02K 35/00; H02K 35/02; H02K 35/04; H02K 35/06; H02K 7/1869; H02K 7/1876;

(Continued)

(56) References Cited

U.S. PATENT DOCUMENTS 5,107,155 A  *  4/1992  Yamaguchi ............ H02K 7/063
                                                        340/407.1
5,365,497 A    11/1994  Born
                        (Continued)

FOREIGN PATENT DOCUMENTS

EP         0 625 738 A1    11/1994
EP         1 659 676 A1     5/2006
                (Continued)

OTHER PUBLICATIONS

Japanese Office Action dated Apr. 8, 2025, issued in corresponding Japanese Patent Application No. 2023-124286 (with English Translation), 8 pages.

(Continued)

*Primary Examiner* — Maged M Almawri
(74) *Attorney, Agent, or Firm* — Oblon, McClelland, Maier & Neustadt, L.L.P.

(57)         ABSTRACT

A non-acoustic alarm for a portable object includes an electromagnetic motor which can be electrically controlled in order to generate a vibratory effect. The electromagnetic motor includes a movable magnetic circuit and a stationary magnetic circuit. The movable magnetic circuit includes a coil, a ferromagnetic core coupled to a magnetic cage forming an extension of the ferromagnetic core. The magnetic assembly of the movable magnetic circuit constitutes a movable magnetic mass of the non-acoustic alarm capable of generating the vibratory effect. The non-acoustic alarm includes resilient connection elements resiliently connecting the movable magnetic circuit to the stationary magnetic circuit. The resilient connection elements are shaped to guide and ensure that the movable magnetic circuit undergoes a linear, or quasi-linear, oscillatory motion during the electrical control of the electromagnetic motor.

13 Claims, 5 Drawing Sheets

(58) Field of Classification Search
CPC ...... H02K 7/1892; H02K 33/00; H02K 33/02;
H02K 33/16
USPC ............ 310/29, 28, 15, 12.12, 12.15, 12.01
See application file for complete search history.

(56) References Cited

U.S. PATENT DOCUMENTS

| | | | | |
|---|---|---|---|---|
| 7,671,493 | B2 * | 3/2010 | Takashima | G06F 3/016 |
| | | | | 310/15 |
| 7,755,227 | B2 * | 7/2010 | Hirashima | H02K 33/16 |
| | | | | 310/36 |
| 9,350,220 | B2 * | 5/2016 | Kuroda | H02K 33/16 |
| 10,084,367 | B2 * | 9/2018 | Mao | H02K 33/16 |
| 10,363,573 | B2 * | 7/2019 | Huang | B06B 1/045 |
| 10,396,646 | B2 * | 8/2019 | Reiter | H02K 41/0356 |
| 10,674,278 | B2 * | 6/2020 | Zhou | H04R 9/025 |
| 11,784,548 | B2 * | 10/2023 | Berrezag | H04R 11/14 |
| | | | | 310/15 |
| 11,876,425 | B2 * | 1/2024 | Takata | H02K 33/02 |
| 2002/0172060 | A1 * | 11/2002 | Takeuchi | H02K 35/00 |
| | | | | 363/110 |
| 2006/0091984 | A1 * | 5/2006 | Schmidt | H02K 35/02 |
| | | | | 335/78 |
| 2007/0085425 | A1 * | 4/2007 | Hirashima | H02K 33/16 |
| | | | | 310/15 |
| 2007/0228736 | A1 * | 10/2007 | Smushkovich | F03B 15/00 |
| | | | | 290/42 |
| 2011/0025479 | A1 | 2/2011 | Hwang et al. | |
| 2011/0057629 | A1 * | 3/2011 | Lin | H02K 35/02 |
| | | | | 322/3 |
| 2011/0133577 | A1 * | 6/2011 | Lee | H02K 33/18 |
| | | | | 310/15 |
| 2012/0062049 | A1 * | 3/2012 | Baur | H02K 35/02 |
| | | | | 310/28 |
| 2012/0169151 | A1 * | 7/2012 | Dong | H02K 33/16 |
| | | | | 310/25 |
| 2013/0099600 | A1 * | 4/2013 | Park | B06B 1/045 |
| | | | | 310/15 |
| 2015/0333699 | A1 * | 11/2015 | Kim | H03B 5/32 |
| | | | | 345/173 |
| 2017/0019008 | A1 * | 1/2017 | Berrezag | B06B 1/045 |
| 2017/0033654 | A1 * | 2/2017 | Wang | H02K 33/16 |
| 2017/0141667 | A1 * | 5/2017 | Curry | H02K 35/02 |
| 2017/0141668 | A1 * | 5/2017 | Xing | H02K 1/34 |
| 2019/0206601 | A1 * | 7/2019 | Wauke | H01F 7/0289 |
| 2019/0386553 | A1 * | 12/2019 | Lin | H02M 7/00 |
| 2020/0295756 | A1 * | 9/2020 | Liu | H03K 17/98 |
| 2021/0184553 | A1 * | 6/2021 | Berrezag | H02K 33/06 |
| 2023/0318403 | A1 * | 10/2023 | Hurry | H02K 35/02 |
| | | | | 310/20 |

FOREIGN PATENT DOCUMENTS

| | | |
|---|---|---|
| JP | 3512851 B2 | 3/2004 |
| JP | 2018-118233 A | 8/2018 |

OTHER PUBLICATIONS

European Search Report issued Jan. 11, 2023 in European Application 22190383.4 filed on Aug. 15, 2022, 3 pages (with English Translation of Categories of Cited Documents).
Japanese Notice of Reasons of Refusal issued Oct. 1, 2024 in Japanese Patent Application No. 2023-124286 (with English Translation), 12 pages.

* cited by examiner

ELECTROMAGNETIC NON-ACOUSTIC ALARM WITH ELECTROMAGNETIC MOTOR HAVING MOVABLE AND STATIONARY CIRCUITS WITH RESILIENT CONNECTION ELEMENTS

CROSS-REFERENCE TO RELATED APPLICATION

The present application claims priority to European Patent Application No. 22190383.4, filed on Aug. 15, 2022, the entire content and disclosure of which are incorporated by reference herein.

TECHNICAL FIELD OF THE INVENTION

The invention relates to a non-acoustic alarm intended for use in a portable object.

The invention relates more particularly to a small vibrating and resonant non-acoustic alarm, suitable for integration into a portable object of small thickness, such as a timepiece.

The invention further relates to a portable object, such as a timepiece, in particular a watch, comprising such a non-acoustic alarm.

TECHNOLOGICAL BACKGROUND

Conventional alarms fitted to portable objects, and in particular timepieces, can provide acoustic information, for example linked to an event and/or time information, by emitting a sound chosen from a particular range or tone.

The main drawback of these alarms is that they are acoustic and can be perceived by the user's environment.

Furthermore, such acoustic alarms do not allow the portable object of the user (the wearer) to be differentiated from other portable objects belonging to people in the same environment.

It is thus understood that these acoustic alarms have several drawbacks: they are not discreet and are perceptible by people other than the user, which can be problematic in certain environments; they do not allow the wearer to distinguish between his/her portable object and the other portable objects in the same environment, for example within groups of several people.

To overcome this, silent, so-called non-acoustic, vibrating alarms have been proposed and comprise motors driving a mass, the assembly being configured to provide a vibratory effect which can be transmitted to the user. Such a vibration has the advantage of being perceived only by the user, which allows it to be discreet and not disturb people in the user's environment, when the alarm is triggered, for example at the wake-up time, for an incoming call, or for information concerning the time change, etc.

Such a non-acoustic alarm is, for example, disclosed in the European patent document No. 0349230. This alarm comprises a piezoelectric motor that rotates an eccentric weight movably mounted on a shaft.

However, because of the coaxial configuration of this alarm, it takes up a relatively large amount of space, so much so that it requires a specific arrangement, or even a complete reconstruction of a timepiece, in order to be mounted in this timepiece, which is problematic.

Moreover, this non-acoustic alarm requires the use of a piezoelectric motor, the manufacture whereof involves relatively complex techniques.

To address this issue, a non-acoustic alarm disclosed in the European patent document No. 0625738 A1 has been developed with a simpler design, smaller overall dimensions and a lower manufacturing cost.

The non-acoustic alarm of the European patent document No. 0625738 A1 comprises an electromagnetic motor fixedly mounted on a support, the electromagnetic motor moving a heavy mass to provide a vibratory effect with the mass undergoing a quasi-linear oscillatory motion.

Such a non-acoustic alarm has a power consumption in the order of 10 mW.

However, in the field of portable objects, there is a constant need to improve the design, overall dimensions and/or power consumption of the various components of portable objects, such as alarms in particular, and in particular to increase the life of portable objects by minimising the power consumption of the various members forming the portable object.

SUMMARY OF THE INVENTION

In this context, the invention aims to provide a solution to at least one of the problems described hereinabove.

In particular, the invention aims to provide a non-acoustic alarm of a simplified design that can be easily integrated into portable objects, in particular timepieces, without significant modification to the structure thereof, and which can be produced at a low cost, for example by high-speed, automated operations, and which has a reduced power consumption.

In this context, the invention relates to a non-acoustic alarm for a portable object comprising electromagnetic motor means which can be electrically controlled in order to generate a vibratory effect, said non-acoustic alarm being characterised in that:

- the electromagnetic motor means comprise a movable magnetic circuit and a stationary magnetic circuit; said movable magnetic circuit comprising a coil, a ferromagnetic core magnetically coupled to a magnetic cage forming an extension of the ferromagnetic core; the magnetic assembly of said movable magnetic circuit constituting a movable magnetic mass of said non-acoustic alarm capable of generating said vibratory effect;
- and in that it comprises resilient connection elements resiliently connecting the movable magnetic circuit to the stationary magnetic circuit, the resilient connection elements being shaped to guide and ensure that the movable magnetic circuit undergoes a linear, or quasi-linear, oscillatory motion during the electrical control of the electromagnetic motor means.

In addition to the features mentioned in the preceding paragraph, the electromagnetic non-acoustic alarm according to the invention can have one or more complementary features from among the following, considered either on an individual basis or according to any combination technically possible:

- the stationary magnetic circuit comprises two elements made of magnetic material;
- the two elements made of magnetic material are permanent magnets;
- the stationary magnetic circuit comprises a shunt to close the magnetic flux at the stationary magnetic circuit induced by the coil of the movable magnetic circuit;
- the resilient connection elements belong to a support receiving the stationary magnetic circuit and the movable magnetic circuit;
- the support comprises a stationary part receiving the stationary magnetic circuit and a movable part receiving the movable magnetic circuit, the resilient connection elements mechanically connecting the movable part of the support to the stationary part thereof, while guiding the movable magnetic circuit and ensuring that it undergoes a linear, or quasi-linear, oscillatory motion during the electrical control of the electromagnetic motor means;

the stationary part of the support comprises fastening means capable of making the stationary part of the support integral with the portable object;

the support is formed by a lower half-shell and an upper half-shell shaped to encapsulate the movable magnetic circuit and the stationary magnetic circuit of the electromagnetic motor means;

each half-shell of the support comprises two lateral resilient tabs forming the resilient connection elements, configured to laterally flank the electromechanical motor means;

the magnetic cage comprises two branches forming pole shoes configured to guide a magnetic field induced by the coil in the vicinity of the stationary magnetic circuit;

the two branches forming the pole shoes and the ferromagnetic core delimit, together with the stationary magnetic circuit, an air gap e extending perpendicularly to the linear, or quasi-linear, oscillatory motion of the movable magnetic circuit;

the non-acoustic alarm comprises an electronic control unit configured to supply electrical power to the coil so as to cause the movable magnetic circuit to oscillate at the resonant frequency thereof;

said resonant frequency of the movable magnetic circuit is determined by the geometry of the resilient connection elements and by the mass of the movable magnetic circuit;

the movable magnetic circuit and the geometry of the resilient connection elements are configured so that the resonant frequency of the movable magnetic circuit is between 120 Hz and 250 Hz. This frequency range corresponds to the frequencies best felt by the wrist of the user;

the non-acoustic alarm comprises an electronic control unit configured to supply electrical power to the coil so as to cause the movable magnetic circuit to oscillate at a chosen frequency between 120 Hz et 250 Hz.

The invention further relates to a portable object comprising a non-acoustic alarm according to the invention.

Preferably, the portable object is a timepiece, for example a watch.

BRIEF DESCRIPTION OF THE FIGURES

The purposes, advantages and features of the present invention will be better understood upon reading the detailed description given below with reference to the following figures.

4

Figure 1:
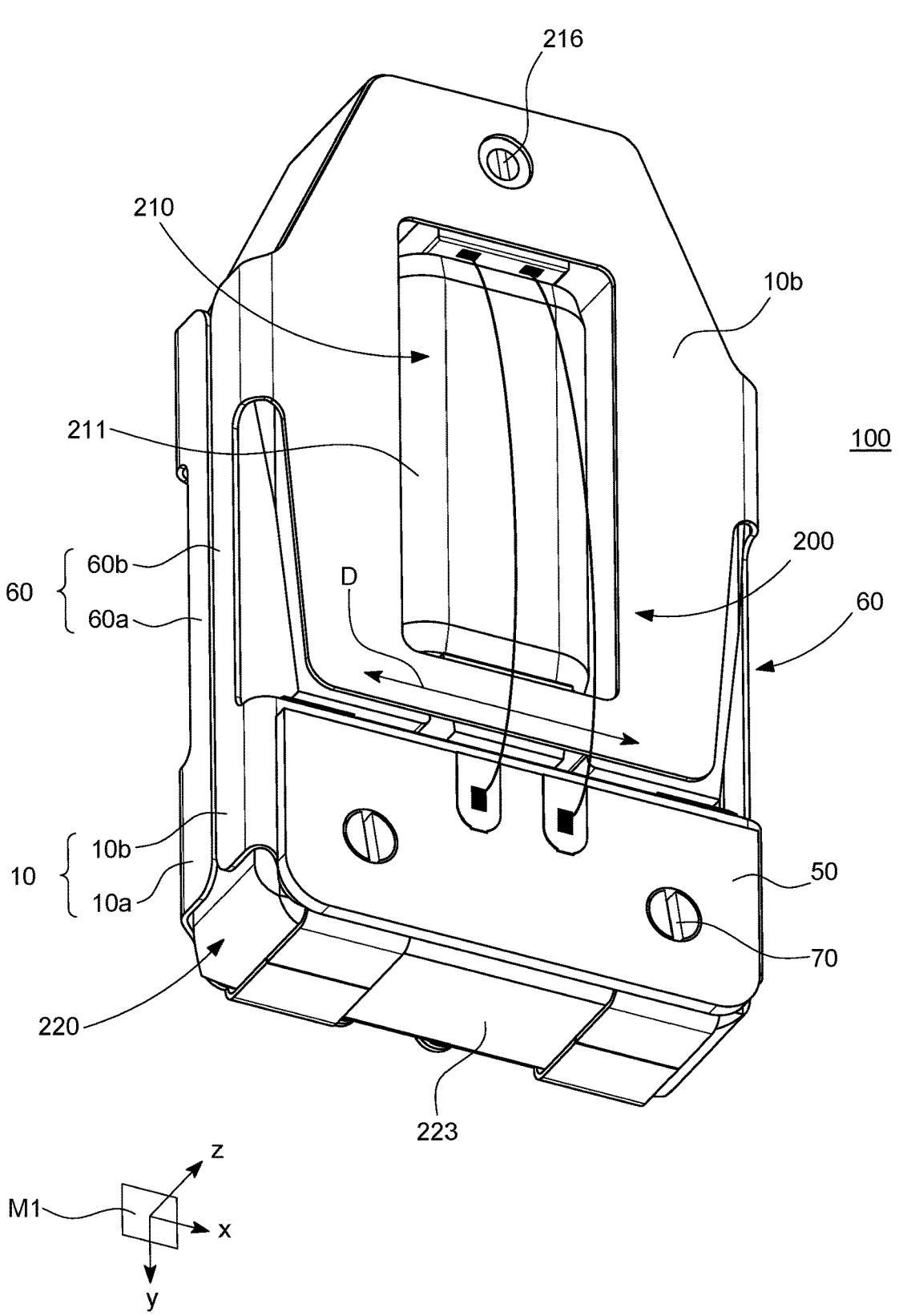
FIG. 1 is a perspective comprehensive view diagrammatically illustrating an example embodiment of a non-acoustic alarm according to the invention.
Figure 3:
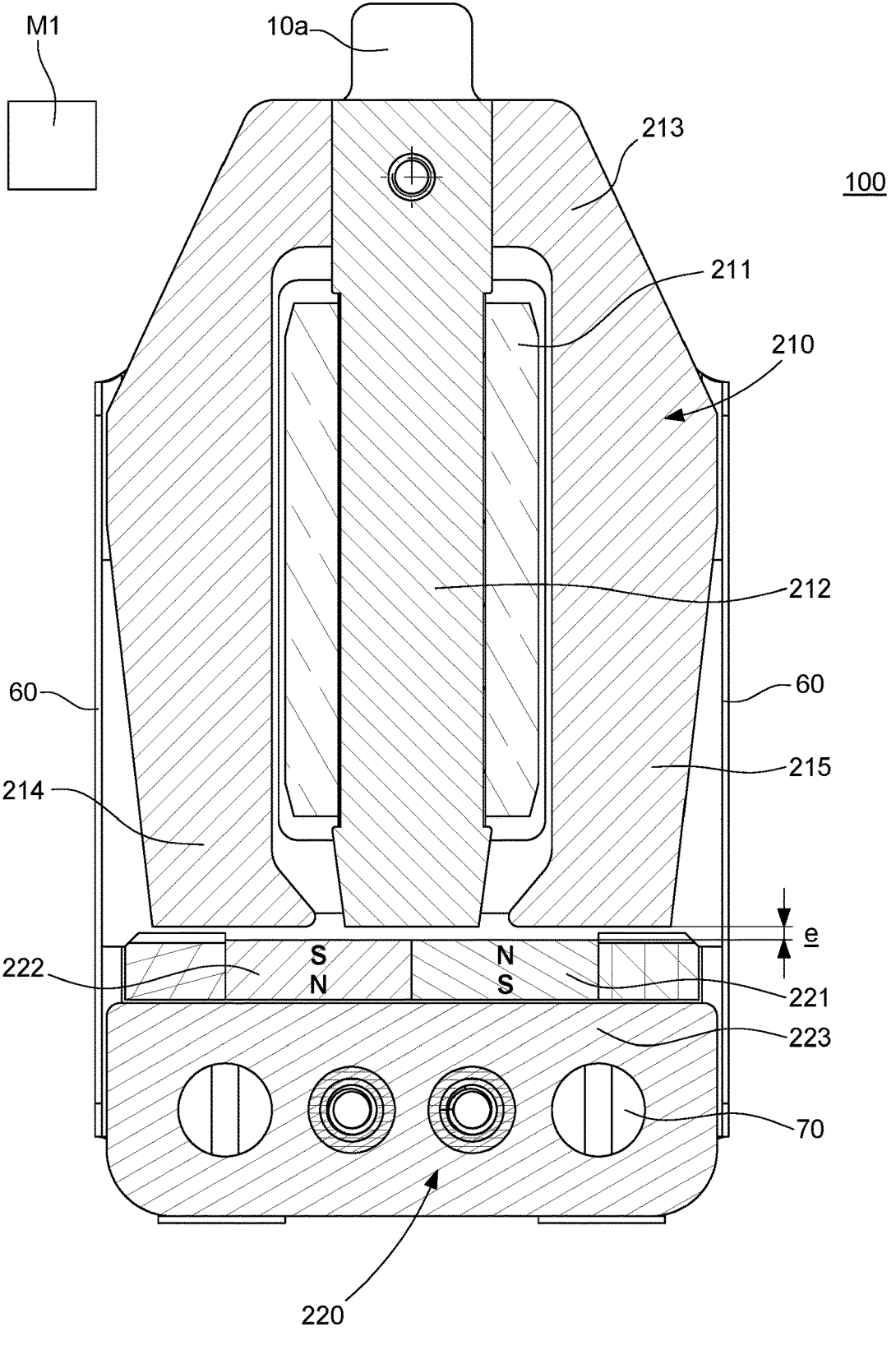
FIG. 3 shows a sectional view of the non-acoustic alarm 100 illustrated in FIG. 1, along a median cutting plane M1.
Figure 4:
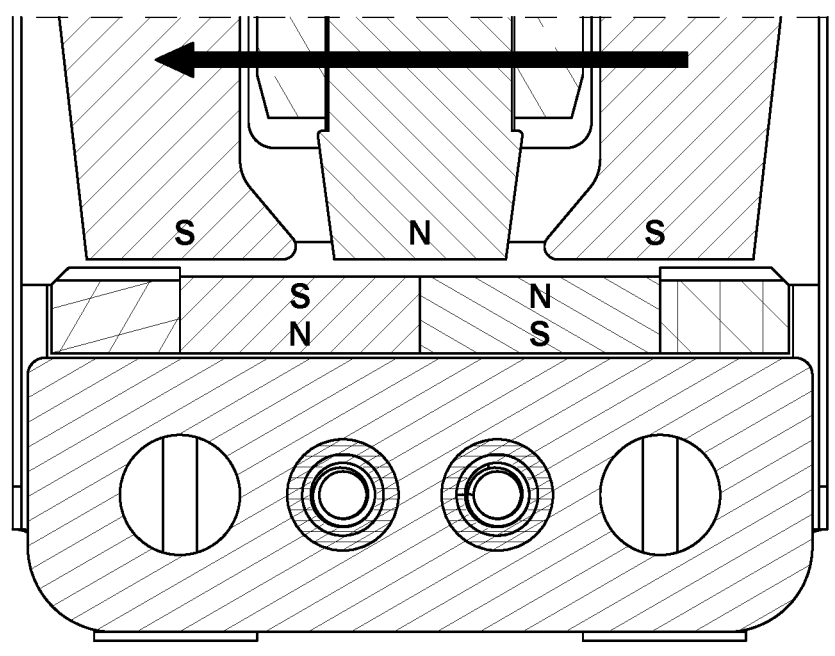
Figure 5:
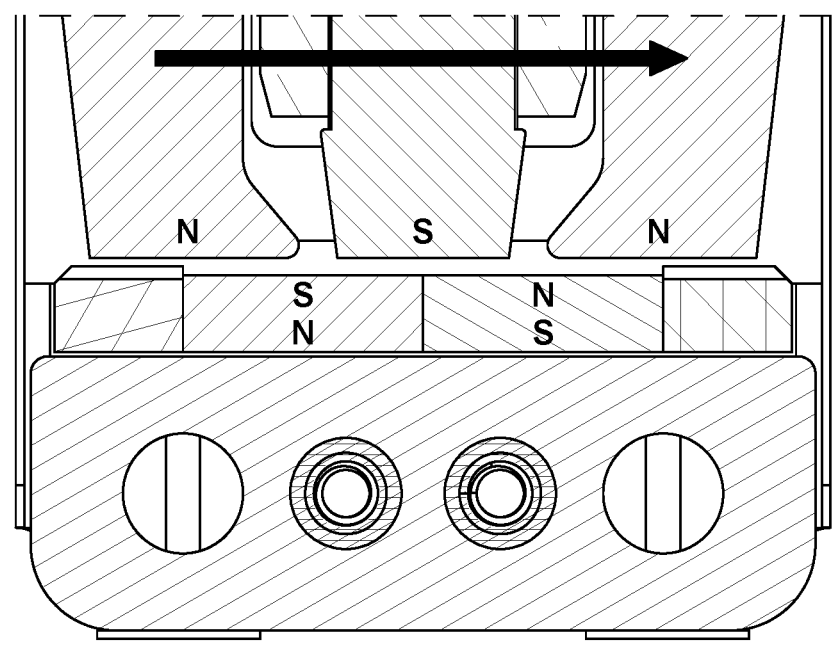
Figure 6:
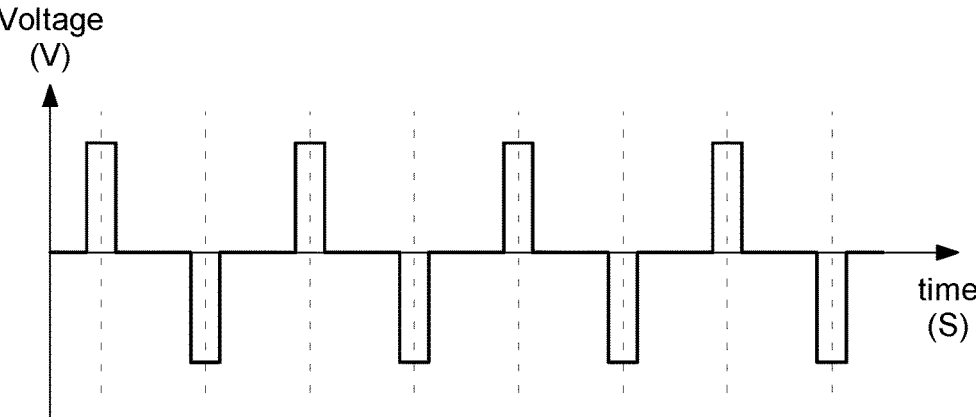
Figure 7:
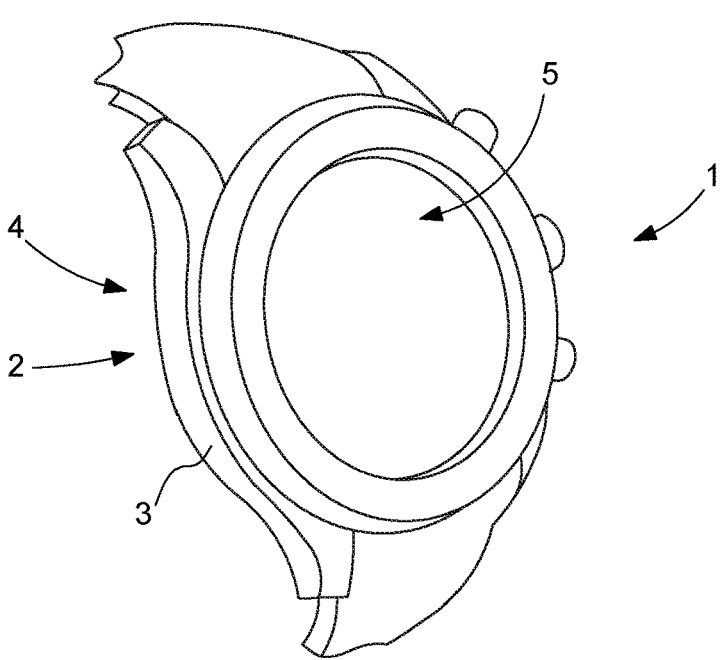

FIG. 4 is a detailed view of FIG. 3, particularly illustrating the different polarities of the magnetic circuit of the electromagnetic motor means when the coil receives a positive power supply;

FIG. 5 is a detailed view of FIG. 3, particularly illustrating the different polarities of the magnetic circuit of the electromagnetic motor means when the coil receives a negative power supply;

FIG. 6 is a graph illustrating an example of the power supply to the electromagnetic motor means of the non-acoustic alarm according to the invention, in order to generate a vibratory effect perceptible to the user;

FIG. 7 is a diagrammatic view of a timepiece integrating a non-acoustic alarm according to the invention illustrated in FIG. 1.

In all figures, common elements bear the same reference numerals unless indicated otherwise.

DETAILED DESCRIPTION OF THE
INVENTION

FIG. 1 is a perspective view diagrammatically illustrating an example embodiment of a non-acoustic alarm 100 according to the invention.

Figure 2:
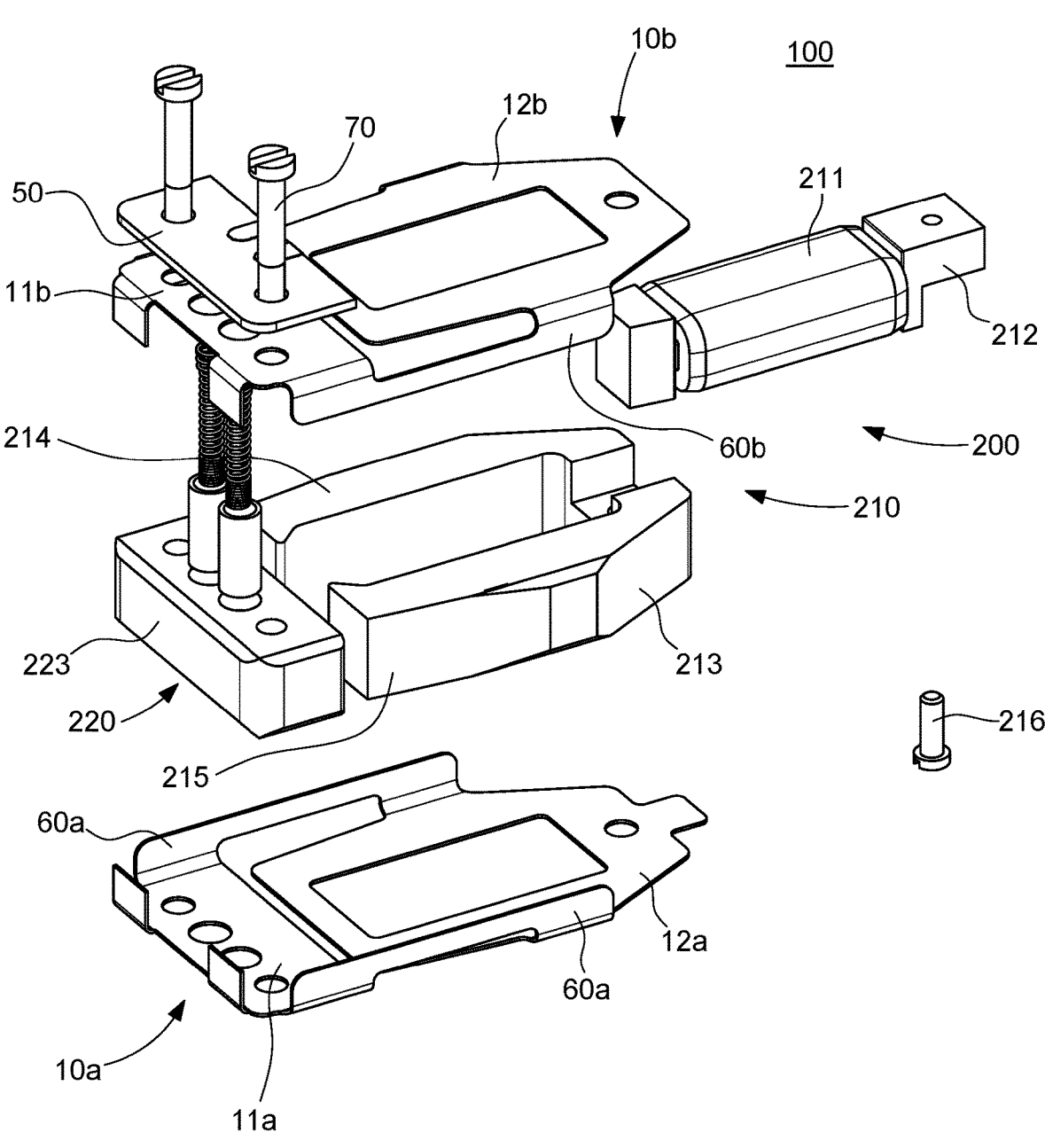
FIG. 2 shows an exploded view of the non-acoustic alarm illustrated in FIG. 1, allowing the various components of the non-acoustic alarm according to the invention to be viewed.

FIG. 2 shows an exploded view of the non-acoustic alarm 100 illustrated in FIG. 1, allowing the various components of the non-acoustic alarm to be viewed.

FIG. 3 shows a sectional view of the non-acoustic alarm 100 illustrated in FIG. 1, along the median cutting plane M1 illustrated in FIG. 1. The non-acoustic alarm 100 according to the invention is a non-acoustic alarm, of the electromagnetic type, comprising electromagnetic motor means 200 which can be electrically controlled to set a movable member in motion in order to generate a vibratory effect by the oscillation of the movable member.

The non-acoustic alarm 100 according to the invention is particularly suitable for being fitted to small portable objects, such as a timepiece 1 for example.

Such a timepiece 1 is diagrammatically shown in FIG. 7, by way of example.

The timepiece 1 comprises a case 2 consisting of a middle 3 and a back 4 fastened to the middle 3 in a conventional manner. The case 2 defines an internal space 5 configured to receive a horometric movement (not shown) as well as a non-acoustic alarm 100 according to the invention.

The timepiece 1 further comprises a power source, not shown, for example a battery, configured to electrically power at least the non-acoustic alarm 100 according to the invention.

Preferably, the power source is electrically connected to an electronic control unit 50 configured to drive the electromagnetic motor means 200 of the non-acoustic alarm 100 according to the invention.

The non-acoustic alarm 100 according to the invention fitted to the timepiece 1 will be described in more detail now with reference to FIGS. 1 to 3.

The non-acoustic alarm 100 comprises:

a support 10 which can comprise ad-hoc fastening elements 70 allowing the non-acoustic alarm 100 to be fastened to the timepiece 1;

the electronic control unit 50, which can be electrically connected to the power source with which the portable object is fitted;

electromagnetic motor means 200 electrically connected to the electronic control unit 50, capable of generating a vibratory effect.

The electromagnetic motor means 200 are electrically controlled by the electronic control unit 50 to set a movable member in motion, so as to obtain a vibratory effect perceptible to the user wearing the timepiece 1, or the portable object, for example via the back 4 in contact with the user.

The electronic control unit 50 is configured to excite the electromagnetic motor means 200 to the resonant frequency, or to a frequency near the resonant frequency, of the non-acoustic alarm 100.

Preferably, the electronic control unit 50 is configured to excite the electromagnetic motor means 200 and generate a vibration at a frequency between 120 Hz and 250 Hz.

The electromagnetic motor means 200 comprise a magnetic circuit consisting of a movable magnetic circuit 210 and a stationary magnetic circuit 220. The movable magnetic circuit 210 and the stationary magnetic circuit 220 are carried by a support 10.

The support 10 is a multifunctional element comprising a stationary part 11a, 11b carrying the stationary magnetic circuit 220. The stationary part 11a, 11b of the support 10 also carries the electronic control unit 50.

The stationary magnetic circuit 220 is, for example, made integral with the stationary part 11a, 11b of the support 10 by fastening means, for example by electrical welding, referred to as spot welding.

The support 10 further comprises a movable part 12a, 12b shaped to carry the movable magnetic circuit 210.

The movable magnetic circuit 210 is made integral with the movable part 12a, 12b of the support 10 by fastening means, for example by electrical welding, referred to as spot welding.

The stationary part 11a, 11b of the support 10 is intended to be made integral with the timepiece, for example at the back 4 of the timepiece 1, for example by screwing or bonding.

As shown in FIG. 2, the stationary part 11a, 11b of the support 10 cooperates with the fastening elements 70, of the screw type, to make the stationary part 11a, 11b of the support 10 integral with the timepiece 1.

The electronic control unit 50 is, for example, made integral with the stationary part 11a, 11b of the support 10 by bonding, or by the fastening means 70 allowing the support 10 to be made integral with the timepiece 1.

The support 10 further comprises resilient connection elements 60 mechanically connecting the movable part 12a, 12b and the stationary part 11a, 11b of the support 10. The resilient connection elements 60 are formed by thin resilient flexible strips 60a, 60b, extending in a plane perpendicular to the plane formed by the stationary part 11a, 11b and the movable part 12a, 12b of the support 10, and parallel to the median plane M1.

The resilient connection elements 60 are configured to provide support to the movable part 12a, 12b of the support 10, and thus to the movable magnetic circuit 210, in particular in the z and y directions, while allowing for a lateral displacement of the movable magnetic circuit 210, by a translational motion, in the x direction.

The resilient connection elements 60 are shaped to be flexible in a given direction, in this case in the x direction, in order to allow the movable magnetic circuit 210 to undergo a linear or quasi-linear oscillation relative to the stationary magnetic circuit 220, in a lateral direction indicated by the arrow D in FIG. 1.

In other words, the support 10 and the shape and disposition of the resilient connection elements 60 relative to the movable magnetic circuit 210 and stationary magnetic circuit 220 allow for a lateral displacement, substantially in translation in the x direction, of the movable magnetic circuit 210 relative to the stationary magnetic circuit 220, under the control of the electronic control unit 50.

The resilient connection elements 60 are flexible strips that are fixedly connected to the support 10 or formed integrally in one piece with the support 10.

The resilient connection elements 60 flank the movable magnetic circuit 210 on both sides.

The resilient connection elements 60 also have a resilient return function biased to bring the movable magnetic circuit 210 back to a resting position of equilibrium, without placing any electrical load on the electromagnetic motor means 200.

By way of example, each resilient connection element 60 is composed of a lower tab 60a and an upper tab 60b disposed symmetrically at each edge of the electromagnetic motor means 200, relative to a median plane M1, dividing the non-acoustic alarm 100 in two along the height.

The support 10 is advantageously made of two separate parts forming a lower half-shell 10a and an upper half-shell 10b, the two half-shells 10a, 10b being configured to encapsulate and hold the electromagnetic motor means 200, and more particularly the movable magnetic circuit 210 and the stationary magnetic circuit 220. Each half-shell 10a, 10b comprises two lateral resilient tabs 60a, 60b forming the resilient connection elements 60 described hereinabove. The symmetrically arranged resilient tabs 60a, 60b thus enable an upper portion of the electromechanical motor means 200 and a lower portion of the electromechanical motor means 200 to be laterally flanked. Thus, such a configuration avoids displacements along the z axis by resilient deformation of the resilient tabs 60a, 60b.

The half-shells 10a, 10b of the support 10 are made, for example, from a flat, for example metal, thin plate, and the resilient tabs 60a, 60b are formed integrally in one piece with the stationary parts 11a, 11b and the movable parts 12a, 12b of the support 10.

The movable magnetic circuit 210 comprises a ferromagnetic core 212 and a coil 211 wound around the ferromagnetic core 212 in a conventional manner.

The ferromagnetic core 212 is coupled to a magnetic cage 213 at one of the poles of the ferromagnetic core 212, such that the magnetic cage 213 forms an extension of the ferromagnetic core 212. The ferromagnetic core 212 is made integral with the magnetic cage 213 by ad-hoc fastening means, for example by a screw element 216.

The magnetic assembly of the movable magnetic circuit 210 is sufficiently heavy to constitute a movable mass capable of generating a vibratory effect that can be perceived by the user.

In the example embodiment shown in FIGS. 1 to 3, and as particularly visible in FIG. 2, the ferromagnetic core 212 is separate from the magnetic cage 213; however, the ferromagnetic core 212 and the magnetic cage 213 can be in one piece. Being produced separately makes it easier to wind the coil 211 around the ferromagnetic core 212.

According to the invention, the vibrating movable mass of the non-acoustic alarm 100 is formed by the movable part 210 of the magnetic circuit of the electromagnetic motor means 200. The vibrating mass thus belongs to the magnetic circuit of the non-acoustic alarm 100.

In other words, the movable magnetic circuit 210 also acts as a movable mass of the vibratory system, such that in the non-acoustic alarm 100 according to the invention, a specific, added mass, for example made of a non-magnetic metal, mechanically coupled to a part of the magnetic circuit, acting solely as a vibrating mass and which does not contribute to the magnetic circuit of the electromagnetic motor means, is not necessary.

Thus, unlike the solutions of the prior art, the movable mass of the non-acoustic alarm 100 according to the invention is a magnetic, or ferromagnetic, mass, also constituting the movable magnetic circuit 210 of the electromagnetic motor means 200.

The stationary magnetic circuit 220 comprises two elements 221, 222 made of magnetic material.

Preferably, the two elements made of magnetic material are permanent magnets.

Each permanent magnet 221, 222 has a permanent north-south magnetisation axis (indicated as N-S) which is oriented perpendicular to the translational motion of the movable magnetic circuit 210. The two permanent magnets 221, 222 have a magnetisation axis that is the reverse of one another.

The stationary magnetic circuit 220 further comprises a shunt 223 to close the magnetic flux at the stationary magnetic circuit 220 and keep magnetic leakage to a minimum. This optimises the performance of the non-acoustic alarm.

The magnetic cage 213 comprises two parallel branches 214, 215 which flank the coil 211 laterally and extend towards the stationary magnetic circuit 220.

The two branches 214, 215 constitute pole shoes of the ferromagnetic core 212 of the coil 211 configured to guide the magnetic flux of the movable magnetic circuit 210 induced by the coil 211, in the vicinity of the stationary magnetic circuit 220, and more particularly in the vicinity of the permanent magnets 221, 222.

The two branches 214, 215 extend opposite the permanent magnets 221, 222.

The two branches 214, 215 and the ferromagnetic core 212, delimit, together with the permanent magnets 221, 222, an air gape which extends perpendicular to the lateral displacement of the movable magnetic circuit 210.

Operation of the Non-Acoustic Alarm According to the Invention

Under the control of the electronic control unit 50, the coil 211 can be electrically powered and generate a magnetic flux which can flow within the ferromagnetic core 212 and propagate into the magnetic cage 213 at the pole shoes 214, 215 and can be closed by passing via the permanent magnets 221, 222 and the shunt 223, via the air gap e.

When the coil 211 receives a positive power supply, for example in a pulsed form, as shown in FIG. 6, the ferromagnetic core 212 is polarised, as well as the two branches of the magnetic cage 213 as shown in FIG. 4. The different polarities interact with the polarities of the permanent magnets 221, 222, such that the poles of the same sign repel one another and the poles of the opposite sign attract one another, thus creating a magnetic force which translates the movable magnetic circuit 210 laterally to the left in the x direction under the effect of the polarities of the permanent magnets.

When the coil 211 receives a negative power supply, for example in the pulsed form shown in FIG. 6, the polarities are reversed and the movable magnetic circuit 210 is translated laterally to the right in the x direction under the effect of the polarities of the permanent magnets, as shown in FIG. 5.

Thus, under an AC power supply, the movable magnetic circuit 210 will be displaced laterally alternately from left to right in a translational motion in the x direction, guided by the resilient connection elements 60. The displacements will stress the resilient connection elements 60, which will work return the movable magnetic circuit 210 to its initial position, by resilient return effect, and so on to oscillate around this initial position of equilibrium, or of rest, in a to-and-fro lateral translation motion. Thus, by choosing an appropriate power supply in terms of frequency and amplitude, a vibratory effect is created in the case 2 of the timepiece 1 that can be perceived by the wearer.

Advantageously, the electronic control unit 50 is configured to generate a power supply to the coil 211, as shown by way of example in FIG. 6, in the form of alternating pulses to sustain the oscillatory motion of the movable magnetic circuit 210, the pulses compensating for the damping of the oscillatory motion of the movable magnetic circuit 210.

The non-acoustic alarm 100 according to the invention, and as described hereinabove, has smaller overall dimensions, which make it ideally suited to a horological application since the shape thereof is essentially flat and thin, allowing it to be easily integrated into a watch case without making any major modifications to the other components. For information only, such a non-acoustic alarm according to the invention could be produced with a total height of about 3 mm.

The overall dimensions and weight have been particularly reduced, in particular by eliminating a dedicated movable mass made of non-magnetic metal.

The non-acoustic alarm according to the invention has an optimised magnetic design with pole shoes and a shunt, which prevents magnetic leakage and optimises magnetic efficiency. Thus, the power consumption of such an alarm is optimised and reduced. For information only, the power consumption of such a non-acoustic alarm could be measured at less than 10 mW.

The inverted architecture, of the movable coil type, of the non-acoustic alarm according to the invention with the setting of the part of the magnetic circuit comprising the coil in motion, also allows the power consumption of such a non-acoustic alarm to be reduced, by overcoming the need to set a dedicated non-magnetic heavy mass in motion.

Finally, in contrast to the solutions of the prior art, the proposed inverted architecture overcomes the need to use a specific mass, for example made of tungsten. Thus, the manufacturing costs of such a non-acoustic alarm are also reduced.

The invention claimed is:

1. A non-acoustic alarm for a portable object comprising:
    an electromagnetic motor configured to be electrically controlled in order to generate a vibratory effect, wherein the electromagnetic motor comprises a movable magnetic circuit and a stationary magnetic circuit, said movable magnetic circuit comprising a coil, a ferromagnetic core coupled to a magnetic cage forming an extension of the ferromagnetic core, a magnetic assembly of said movable magnetic circuit constituting a movable magnetic mass of said non-acoustic alarm to generate said vibratory effect; and
    resilient connection elements resiliently connecting the movable magnetic circuit to the stationary magnetic circuit, the resilient connection elements being shaped to guide and ensure that the movable magnetic circuit undergoes a linear, or quasi-linear, oscillatory motion during the electrical control of the electromagnetic motor,
    wherein the resilient connection elements belong to a support that receives the stationary magnetic circuit and the movable magnetic circuit, and
    wherein the support comprises a stationary part receiving the stationary magnetic circuit and a movable part receiving the movable magnetic circuit, the resilient connection elements mechanically connecting the movable part of the support to the stationary part thereof, while guiding the movable magnetic circuit and ensuring that the movable magnetic circuit undergoes the linear, or quasi-linear, oscillatory motion during the electrical control of the electromagnetic motor.

2. The non-acoustic alarm for a portable object according to claim 1, wherein the stationary part of the support comprises a fastener configured to make the stationary part of the support integral with the portable object.

3. The non-acoustic alarm for a portable object according to claim 1, further comprising an electronic control unit configured to supply electrical power to the coil so as to cause the movable magnetic circuit to oscillate at the resonant frequency thereof.

4. The non-acoustic alarm for a portable object according to claim 1, further comprising an electronic control unit configured to supply electrical power to the coil so as to cause the movable magnetic circuit to oscillate at a chosen frequency between 120 Hz et 250 Hz.

5. The non-acoustic alarm for a portable object according to claim 1, wherein the support is formed by a lower half-shell and an upper half-shell shaped to encapsulate the movable magnetic circuit and the stationary magnetic circuit of the electromagnetic motor.

6. The non-acoustic alarm for a portable object according to claim 5, wherein each half-shell of the support comprises two lateral resilient tabs forming the resilient connection elements, configured to laterally flank the electromagnetic motor.

7. The non-acoustic alarm for a portable object according to claim 1, wherein the magnetic cage comprises two branches forming pole shoes configured to guide a magnetic flux induced by the coil in the vicinity of the stationary magnetic circuit.

8. The non-acoustic alarm for a portable object according to claim 7, wherein the two branches forming the pole shoes and the ferromagnetic core delimit, together with the stationary magnetic circuit, an air gap extending perpendicularly to the linear, or quasi-linear, oscillatory motion of the movable magnetic circuit.

9. A portable object comprising:

the non-acoustic alarm according to claim 1.

10. The portable object according to claim 9, wherein the portable object is a timepiece.

11. The non-acoustic alarm for a portable object according to claim 1, wherein the stationary magnetic circuit comprises two elements made of magnetic material.

12. The non-acoustic alarm for a portable object according to claim 11, wherein the two elements made of magnetic material are permanent magnets.

13. The non-acoustic alarm for a portable object according to claim 12, wherein the stationary magnetic circuit comprises a shunt to close the magnetic flux at the stationary magnetic circuit.

* * * * *